United States Patent [19]
Kwasnik

[11] Patent Number: 5,616,846
[45] Date of Patent: Apr. 1, 1997

[54] METHOD AND APPARATUS FOR CURRENT REGULATION AND TEMPERATURE COMPENSATION

[76] Inventor: Joseph W. Kwasnik, 49 Sixth Ave., North Tonawanda, N.Y. 14120

[21] Appl. No.: 329,418

[22] Filed: Oct. 27, 1994

[51] Int. Cl.$^6$ .......................... G01L 19/04; G01C 19/02
[52] U.S. Cl. .................. 73/708; 73/726; 340/870.39; 340/870.16
[58] Field of Search .................. 340/870.04, 870.38, 340/870.39, 870.3, 870.16, 870.17; 73/708, 720, 721, 726, 727

[56] References Cited

U.S. PATENT DOCUMENTS

| | | | |
|---|---|---|---|
| 3,854,039 | 12/1974 | Serrano | 364/510 |
| 4,071,823 | 1/1978 | Okayama | 340/870.38 X |
| 4,096,748 | 6/1978 | Pichon . | |
| 4,840,067 | 6/1989 | Nishida et al. | 73/726 |
| 5,069,066 | 12/1991 | Djorup . | |
| 5,076,376 | 12/1991 | Bizet et al. . | |
| 5,163,325 | 11/1992 | White et al. . | |
| 5,163,326 | 11/1992 | Frick . | |
| 5,510,779 | 4/1996 | Maltby et al. | 340/870.16 X |

FOREIGN PATENT DOCUMENTS

| | | |
|---|---|---|
| 1-145574 | 6/1989 | Japan . |
| 1263182 | 2/1972 | United Kingdom . |

*Primary Examiner*—Sandra L. O'Shea
*Assistant Examiner*—Joseph L. Felber
*Attorney, Agent, or Firm*—Jaeckle Fleischmann & Mugel, LLP

[57] ABSTRACT

A temperature compensation circuit is connected to the output of a strain gauge pressure sensor having a wheatstone bridge arrangement. The signal from the wheatstone bridge sensor is amplified and converted by an instrumentation amplifier to produce a load current proportional to the pressure applied to the pressure sensor. The load current indicates the actual pressure applied to the pressure sensor. Constant voltage and current regulators compensate for variations in the load current from the pressure sensor which result from temperature changes.

13 Claims, 3 Drawing Sheets

METHOD AND APPARATUS FOR CURRENT REGULATION AND TEMPERATURE COMPENSATION

BACKGROUND OF THE INVENTION

1. Field of the Invention

The present invention relates to a temperature compensation circuit for a Wheatstone bridge sensor, and more particularly to voltage and current regulators to compensate for variations in the load current resulting from temperature changes.

2. Description of the Prior Art

The operating parameters for elements of a pressure sensor, including the Wheatstone bridge, can vary nonlinearly with a change in temperature. These fluctuations in the operating parameters may cause inaccurate sensor readings. Various methods have been employed by the prior art to compensate for sensor inaccuracies arising from such environmental factors in a variety of sensors including the Wheatstone bridge.

U.S. Pat. No. 4,096,748 issued to Michel Pichon on Jun. 27, 1978, describes a Wheatstone bridge for measuring temperatures by measuring changes in the impedance in the bridge caused by different temperatures. Pichon does not attempt to compensate for any operating parameter of the bridge.

U.S. Pat. No. 5,069,066 issued to Robert S. Djorup on Dec. 3, 1991, describes a constant element anemometer having two Wheatstone bridges. A four-arm Wheatstone bridge is operated as a single arm of a second four-arm Wheatstone bridge. A feedback controlled constant resistance operation is achieved in the bridge within a bridge configuration.

U.S. Pat. No. 5,076,376 issued to Bruno Bizet et al. on Dec. 31, 1991; and GB Patent Specification No. 1,263,182 for Geoffrey Cyril Cooke published on Feb. 9, 1970, both describe strain gauge weighing devices. Neither attempts to compensate for an operating parameter of the bridge.

U.S. Pat. No. 5,163,325 issued to Craig W. White et al. on Nov. 17, 1992, describes self-compensating accelerometer having a leg of resistors connected to the strain gage and controlled by a microprocessor to compensate for temperature variations and manufacturing tolerances. The resistance is varied when the microprocessor switches fixed resistors in parallel connection with the leg of the bridge.

U.S. Pat. No. 5,163,326 issued to Roger L. Frick on Nov. 17, 1992, describes a circuit for compensating a pressure sensor for changes in static pressure, which can cause stray capacitances and non-linearities in the output from a capacitive pressure sensor. The compensation circuit has a capacitive value fixed relative to the capacitive pressure sensor. Frick compensates for static pressure, not variations in temperature.

Japanese Kokai No. 1-145574 filed by Fujikura, Ltd. for Tatsuya Ito and published on Jun. 7, 1989, describes an acceleration sensor including a wheatstone bridge which is balanced by varying the resistance on opposite legs of the bridge. Correction resistances are interposed in series between reference resistances, and correction resistances are selected by connecting a terminal at a node of the reference resistance and the correction resistance to an output terminal.

Though these and other patents disclose circuitry for Wheatstone bridge sensors, the known prior art does not disclose or suggest the use of the constant current regulator of the present invention to minimize the effect of quiescent current variation with temperature. None of the above patent references, either alone or in combination with one another, is seen to describe the instant invention.

SUMMARY OF THE INVENTION

An advantage of the invention is to overcome the foregoing difficulties and shortcomings involved in compensating for fluctuations in the operating parameters, such as the load current, for a Wheatstone bridge sensor resulting from temperature changes.

Another advantage of the invention is to provide a circuit to compensate for quiescent current variations in the sensor resulting from temperature changes.

A further advantage of the invention is to provide a compensation circuit for achieving low zero and span non-linearity for a two wire transmitter having a Wheatstone bridge arrangement.

To achieve these and other advantages of the invention and in accordance with the purpose of the invention, as embodied and broadly described herein, a preferred embodiment of the invention comprises a Wheatstone bridge having a pair of output terminals; an instrumentation amplifier connected across said pair of output terminals to produce a current output; a constant current regulator augments the current output so that a constant current is drawn over an operating temperature range; and a voltage regulator provides a constant voltage over the operating temperature range and supplies an operating current for said sensor apparatus.

These and other advantages of the present invention will become readily apparent upon further review of the following specification and drawings.

DETAILED DESCRIPTION OF THE PREFERRED EMBODIMENTS

Referring now to the accompanying drawings, a preferred embodiment of the present invention is illustrated. None of the disclosed embodiments should be construed as limiting the scope of the present invention. The illustrated embodiments, which are exemplary in nature, show a preferred application of the present invention with a Wheatstone bridge pressure sensor. In the illustrated embodiments, the output signal of Wheatstone bridge 10 is sent to an instrumentation amplifier 20, which amplifies and converts the signal into a current that is proportional to the external pressure applied to the Wheatstone bridge sensor. This current is then measured to indicate the pressure applied to the pressure sensor.

Figure 1:
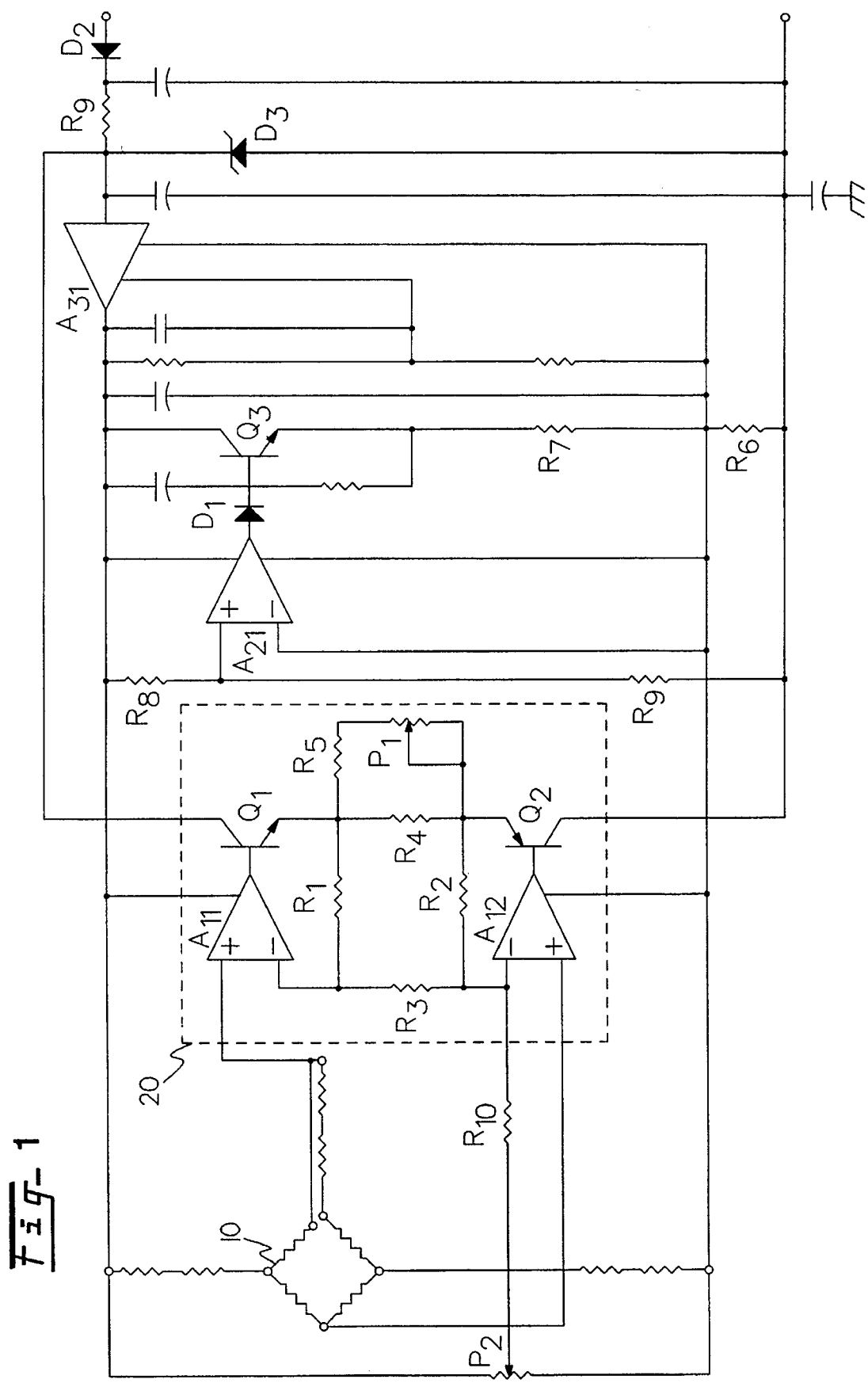
FIG. 1 is a circuit diagram of a preferred embodiment of the invention.

As shown in FIG. 1, in a preferred embodiment of the instant invention operating from +8 to +28 volts dc, instrumentation amplifier 20 includes two integrated circuits, such as operational amplifiers A11 and A12 having the same performance characteristics. The gain for instrumentation amplifier 20 is determined by the resistive values for resistors R1, R2 and R3. Assuming that R1=R2=Rf and the gains for operational amplifiers A11 and A12 are very high, the gain for instrumentation amplifier 20 would equal (1+2Rf/R3). The outputs of operational amplifiers A11 and A12 are connected to the base of NPN transistor Q1 and the base of PNP transistor Q2, respectively. The collectors of both transistors Q1 and Q2 represent very high impedance current sources which allow almost no common mode error. The respective emitters for transistors Q1 and Q2 are connected to the load resistor R4 and fine adjustment resistor R5 and potentiometer P1. The values for resistors R4 and R5 and potentiometer P1 should be chosen as to produce the maximum load current transmitted for the pressure sensor. For a two wire transmitter producing a current from four milliamperes (mA) to 20 mA in proportional response to the pressure applied to the pressure sensor, the resistive values of resistors R4 and R5 and potentiometer P1 should be such as to produce a maximum load current of 20 mA where the pressure is applied to reach full scale on the pressure sensor. The load current is proportional to the actual pressure applied to the pressure sensor.

The tare or zero balance of the pressure sensor is adjusted by resistor R10 and potentiometer P2. In the above example, when no pressure is applied to the sensor, a load current of 4 mA should be present.

The current drawn by the various elements of the sensor, including Wheatstone bridge 10 and the integrated circuits of the instrumentation amplifier, changes in accordance with the temperature. This temperature effect causes the load current of the pressure sensor to be non-linear, thereby causing inaccuracies in the pressure sensor readings.

A constant current regulator introduces additional current to compensate for these fluctuations and provide a constant current which can be drawn over a desired operating range. The quiescent current variations of the circuit elements with temperature are thereby minimized. For example, a constant current of 3 mA should be drawn over a operating temperature range from −65 degrees Fahrenheit (−53.9° C) to +250 degrees Fahrenheit (+121.1° C). Here, the resistive value of resistor R6 is such that when 0.1 dc volts are applied across resistor R6, a current of 3 mA results. The operating currents of the integrated circuits and Wheatstone bridge of the pressure sensor is sensed across resistor R6. When the operating currents fall due to changes in the operating temperatures, additional current from resistor R7 is added to the current operating through resistor R6 to produce exactly 0.1 volts dc across resistor R6 in order to produce a total current of 3 mA. Less current is added from resistor R7 as the operating currents increase at differing temperatures.

The current being drawn through resistor R7 is controlled by operational amplifier A21, diode D1 and NPN transistor Q3. Resistor R8 has the voltage drop across itself from amplifier A31 of the constant voltage regulator. For the present embodiment, the voltage regulator produces a regulated output of 6 volts dc. The resistive value of resistor R9 is selected so as to have 0.1 volts dc across itself. The reference voltage across resistor R8 is sensed by operational amplifier A21 at the positive input. Operational amplifier A21 produces an error signal through diode D1, transistor Q3 and resistor R7 whenever the voltage across resistor R6, as sensed at the negative input of operational amplifier A21, changes due to temperature effects. This causes the current through R6 to be at a constant +3 mA throughout the operating temperature range.

A voltage regulator produces a nearly constant regulated voltage and supplies operating current for the circuit. The constant voltage regulator preferably includes integrated circuit A31 having a low operating current and a regulated output of 6 volts dc with an input excitation of less than 6.5 volts dc. In the present example, the regulated voltage should be constant over the operating temperature range of −65° F. to +250° F. (−53.9° C. to +121.1° C.).

Diodes D2 and D3 serve to protect the circuit from reversed polarity excitation voltage and excessive excitation voltage, respectively. With the correct excitation polarity, diode D2 conducts, and the excitation voltage drop is across R9 and the voltage regulator A31. Where the excitation polarity is reversed, diode D2 becomes non-conductive. Zener diode D3 prevents damage to the voltage regulator where the excitation voltage exceeds the maximum voltage, e.g., 28 volts.

Figure 2:
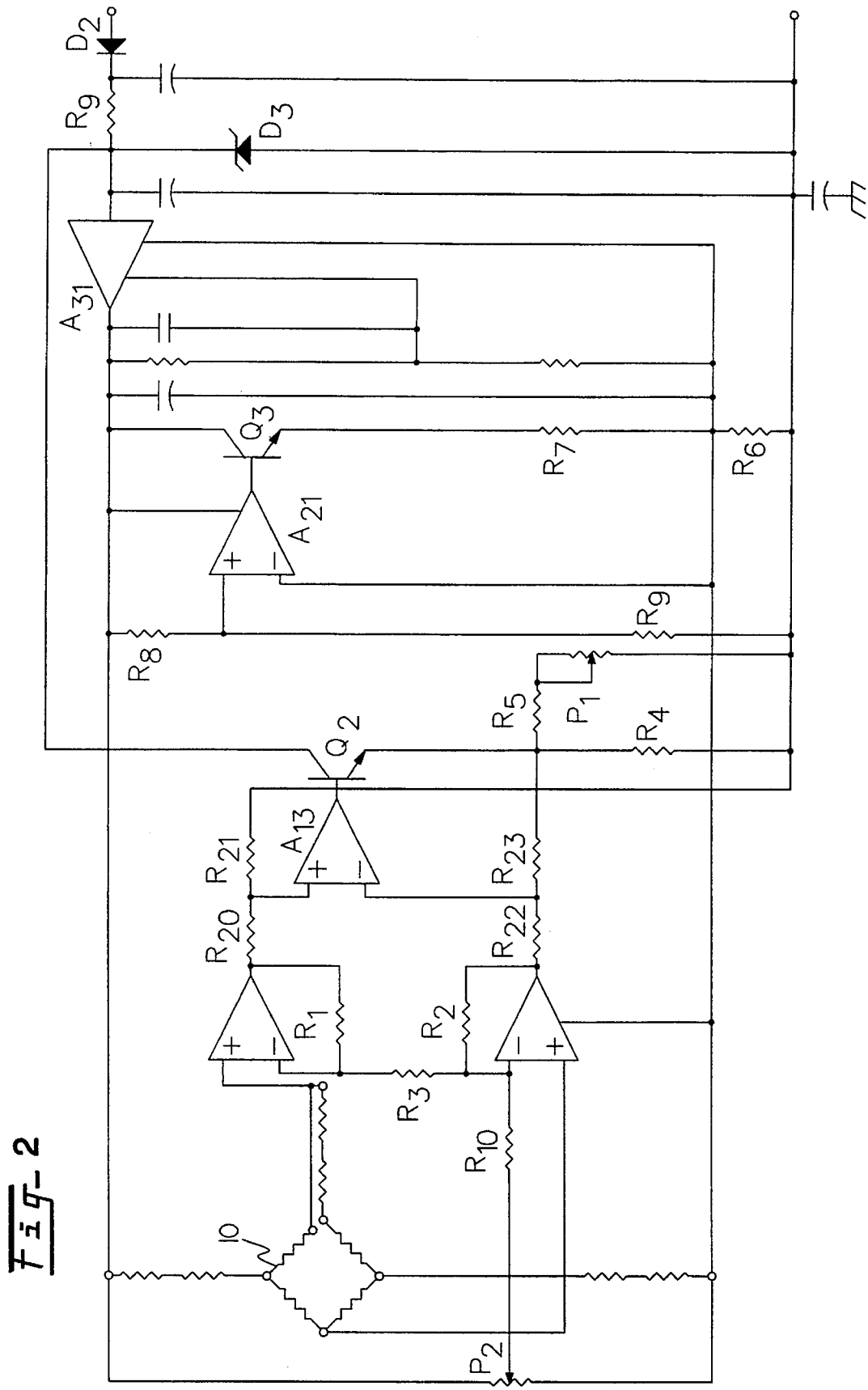
FIG. 2 is a circuit diagram of another preferred embodiment of the invention which uses an instrumentation amplifier having an arrangement of three operational amplifiers.

FIG. 2 shows a second embodiment which operates using an input voltage of +5 to +28 volts dc. The operation of the second embodiment is similar to the embodiment described above, except that the second embodiment uses a three operational amplifier configuration for the instrumentation amplifier 20. Operational amplifier A13 is a unity gain amplifier. The sensor bridge common mode error voltage is determined by resistors R20, R21, R22 and R23, and the characteristics of amplifier A13. The replacement of transistors Q1 and Q2 permits the lower regulator output voltage operation by the elimination of base-to-emitter voltage drops of transistors Q1 and Q2.

Figure 3:
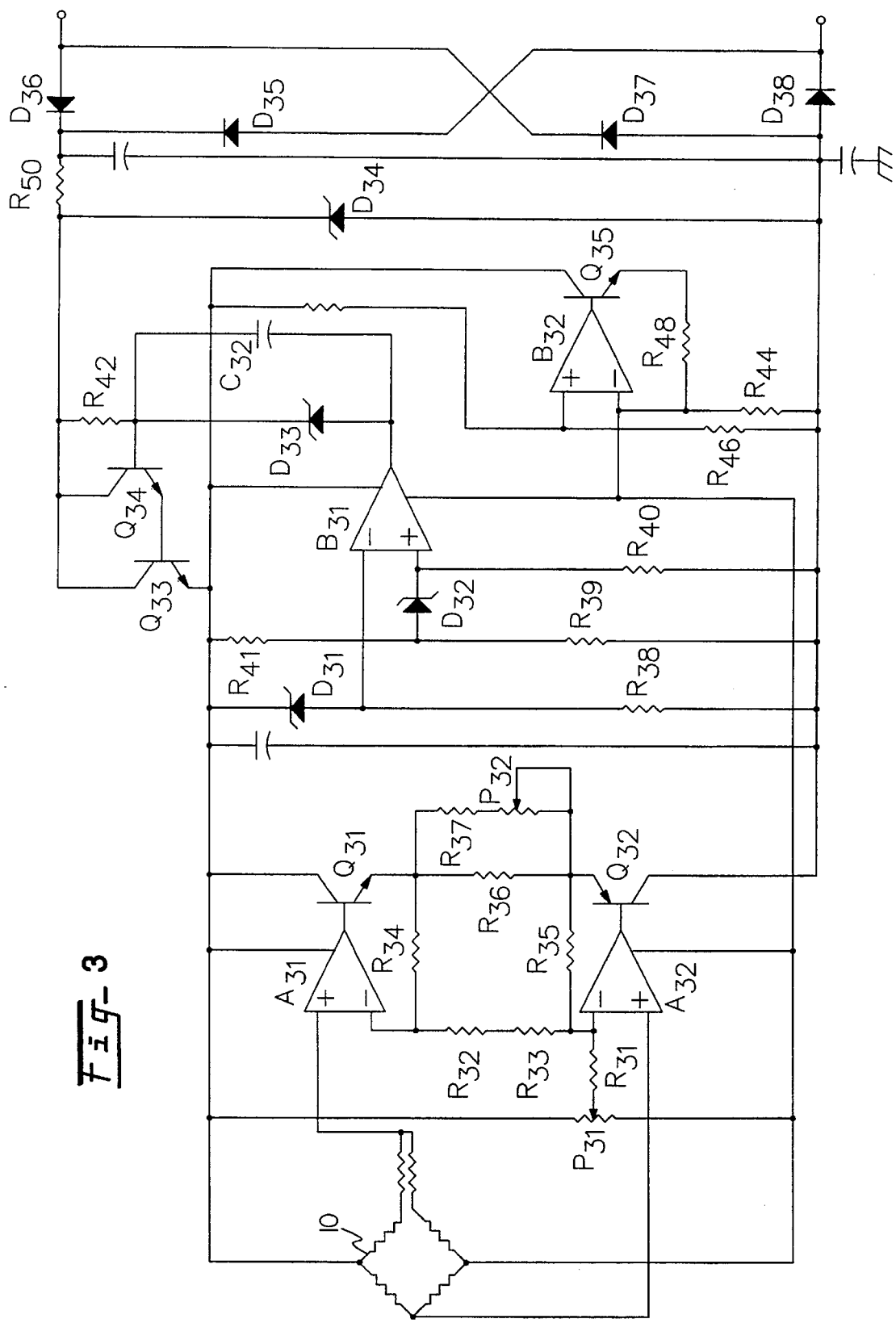
FIG. 3 is a circuit diagram of yet another preferred embodiment of the invention.

A third embodiment of a compensatory circuit for a strain gage pressure sensor 30 is shown in FIG. 3. Current proportional to the applied pressure to the bridge sensor is produced by a strain gage instrumentation amplifier including amplifiers A31 and A32, preferably low quiescent current operational amplifiers with matched DC characteristics. The offset voltages of amplifiers A31 and A32 are matched to reduce the output level changes with temperature. Amplifier feedback resistors R34 and R35, and resistors R32 and R33, determine the overall amplifier gain. R32 is a resistor for basic gain, and R33 is another resistor for introducing a gain change that compensates the strain gage bridge output voltage change with temperature. Zero balance of the sensor is adjusted by potentiometer P31 and resistor R31.

NPN and PNP transistors Q31 and Q32, respectively, are connected in a feedback loop with amplifiers A31 and A32 to produce a current proportional to the change in strain gage voltage caused by external pressure. PNP transistor Q32 acts as a current source and NPN transistor Q31 acts as a current sink. The voltage across resistor R36 produces an emitter current in both transistors Q31 and Q32. The collector of Q32 is connected outside of the current regulator loop. Potentiometer P32 and resistor R37 trim the full scale output level of the circuit to enable fine adjustments of the current produced.

The circuit includes a voltage regulator employing a darlington transistor pair Q33 and Q34. The darlington pair Q33 and Q34 of the voltage regulator are controlled by operational amplifier B31. The output of transistor Q33 is across a bridge circuit consisting of Zener diodes D31 and D32, resistors R38, R39, R40 and R41. Zener reference diode D31 sets the output level, and zener diode D32 compensates the regulator for changes in the output level resulting from the temperature. Both Zener diodes D31 and D32 are preferably 6 volt Zener diodes. The resistive values of resistors R38, R39 and R41 determine the regulated output voltage level. Zener diode D32 and resistor R40 changes the regulated reference voltage to operational amplifier B32 as a function of ambient temperature. The voltage drop across Zener diode D31 is linear with temperature, which causes the regulated output level to decrease at high temperatures. The forward voltage drop of Zener diode D32 closely matches the decreasing voltage drop across Zener diode D32. At the node between diode D32 and resistor R40, the voltage increases relative to common at high temperatures to compensate for the regulator output.

Zener diode D33 allows for the control of the voltage across the base of transistor Q34 by maintaining amplifier B31 in its linear range of operation. The initial bias current for transistor Q34 is supplied through resistor R42. The stored charge in capacitor C32 prevents diode D33 from oscillating. The maximum input supply voltage is limited by the specifications for the collector emitter breakdown voltages for transistors Q33 and Q34 at acceptable power dissipation levels.

Amplifiers B31 and B32 are supplied with the regulated output voltage. Amplifier B31 regulates the current flowing through R44. The current through R44 is adjusted by R46 and R48 to represent a worst case value of the quiescent current. Transistor Q35, which is controlled by B32, introduces additional current through resistor R48 so that a constant current is flowing through resistor R44 in order to minimize quiescent current variations with temperatures. The total regulator current is linearized and the sensitivity of the circuit to variations in the operating current is reduced.

Under normal operating conditions, diodes D36 and D38 are conductive and the excitation voltage drop is across the regulator circuit and resistor R50. When the excitation polarity is reversed, diodes D36 and D38 become nonconductive and no current flows through R50. Preferably, no more than a maximum 0.6 volt reverse voltage drop can appear across the regulator circuit. Transistors Q33 and Q34 prevent any current conduction of the regulator circuit because of the high voltage drop required before conduction can occur.

The above two wire current transmitter for the pressure sensor should have low operating current consumption so that the zero current condition will be met over the entire operating temperature range. However, the operating current will still vary nonlinearly with temperature. The current regulator linearizes the total operating current. The current regulator reduces the sensitivity of the circuit to variations in operating current. Achieving stability of the voltage regulator with temperature, line and load changes are important to the achievement of low zero and span nonlinearilty.

It is to be understood that the present invention is not limited to the exemplary embodiments described above. It will be apparent to those skilled in the art that various modifications and variations are possible within the spirit and scope of the present invention. The present invention encompasses any and all embodiments within the scope of the following claims.

I claim:

1. A current regulation and temperature compensation apparatus, comprising:
   an element which produces a voltage signal proportional to a parameter to be measured, wherein said voltage signal also varies nonlinearly with respect to ambient temperature;
   an instrumentation amplifier operatively arranged to convert said voltage signal to a corresponding first current signal proportional to said measured parameter, wherein said current signal also varies nonlinearly with respect to ambient temperature;
   a voltage regulator operatively arranged to provide power to said element and said instrumentation amplifier, wherein said voltage regulator has an operating current which varies nonlinearly with respect to ambient temperature; and,
   a current regulator which functions to convert said nonlinear voltage signal of said element, said nonlinear current signal of said instrumentation amplifier and said nonlinear operating current of said voltage regulator into a second current signal which is constant;
   wherein an output signal of said current regulating apparatus comprises said first current signal proportional to said measured parameter and said second current signal which is constant.

2. The apparatus of claim 1 wherein the measured parameter is force and the element is a Wheatstone bridge sensor whose resistance legs comprise strain gages.

3. The apparatus of claim 1 wherein said instrumentation amplifier includes a first operational amplifier having a first output, a second operational amplifier having a second output, an NPN transistor having a collector, base and emitter, a PNP transistor having a collector, base and emitter, said first output being connected to the base of the NPN transistor and said second output being connected to the base of the PNP transistor.

4. The apparatus of claim 1, wherein said instrumentation amplifier includes a first operational amplifier having a first output, a second operational amplifier having a second output, a third operational amplifier having a third positive input, a third negative input and a third output, and an NPN transistor having a collector, base and emitter, said first output being connected to said third positive input, said second output being connected to said third negative input, and said third output being connected to the base of the NPN transistor.

5. The apparatus of claim 1, wherein the operating temperature range is from −65° F. to +250° F.

6. The apparatus of claim 1, wherein the voltage regulator comprises a Darlington transistor pair.

7. The apparatus of claim 1, further comprising means for augmenting or diminishing said second constant current output signal by increasing or decreasing the magnitude of said second constant current signal, respectively.

8. A method of regulating current and compensating for changes in temperature, comprising:
   producing a voltage signal proportional to a parameter to be measured, wherein said voltage signal also varies nonlinearly with respect to ambient temperature;
   converting said voltage signal to a corresponding first current signal proportional to said measured parameter, wherein said first current signal also varies nonlinearly with respect to ambient temperature;
   providing power at a regulated voltage to an element which is producing the voltage signal proportional to the parameter to be measured and to a second circuit element which is converting said voltage signal to a corresponding first current signal proportional to said measured parameter, wherein the operating current associated with said supplied power varies nonlinearly with respect to ambient temperature;
   converting said nonlinear voltage signal of said element, said nonlinear first current signal and said nonlinear operating current of said voltage regulator into a second current signal which is constant; and,
   producing a regulated output current signal which comprises said first current signal proportional to said measured parameter and said second current signal which is constant.

9. A method of regulating current as recited in claim 8 wherein said parameter to be measured is force, which is measured by a Wheatstone bridge whose resistance legs comprise strain gages.

10. A method of regulating current and compensating for changes in temperature in a circuit which measures a parameter and produces a current proportional to said measured parameter, comprising:

converting all nonlinear voltage and current signals produced by said circuit as a result of changing ambient temperature into a constant current signal; and, producing an output current which comprises said current proportional to said measured parameter and said constant current signal.

11. The method of claim 10 wherein said measured parameter is force and said nonlinear voltage and current signals are produced by various electronic components within said circuit.

12. The method of claim 10 further comprising the step of augmenting said constant current signal by increasing the magnitude of said constant current signal.

13. The method of claim 10 further comprising the step of diminishing said constant current signal by decreasing the magnitude of said constant current signal.

* * * * *